United States Patent [19]

Schultz et al.

[11] Patent Number: 5,229,087

[45] Date of Patent: Jul. 20, 1993

[54] PROCESS FOR THE PREPARATION OF TITANIUM DIOXIDE

[75] Inventors: Karl-Heinz Schultz; Günter Lailach; Rudolf Gerken, all of Krefeld, Fed. Rep. of Germany

[73] Assignee: Bayer Aktiengesellschaft, Leverkusen, Fed. Rep. of Germany

[21] Appl. No.: 523,107

[22] Filed: May 14, 1990

Related U.S. Application Data

[63] Continuation of Ser. No. 196,000, May 19, 1988, abandoned.

[30] Foreign Application Priority Data

Jun. 4, 1987 [DE]  Fed. Rep. of Germany ....... 3718674

[51] Int. Cl.$^5$ ..................... C01G 23/04; C22B 34/10
[52] U.S. Cl. ...................................... 423/82; 423/610; 423/615
[58] Field of Search ............ 423/82, 530, 610, 615, 423/116

[56] References Cited

U.S. PATENT DOCUMENTS

| | | | |
|---|---|---|---|
| 1,655,940 | 4/1923 | D'Ans et al. | 423/83 |
| 2,098,056 | 11/1937 | McBerty | 423/530 |
| 3,210,156 | 10/1965 | Zirngibl | 423/530 |
| 4,119,698 | 10/1978 | Zimmer et al. | 423/82 |

FOREIGN PATENT DOCUMENTS

| | | |
|---|---|---|
| 0097259 | 5/1983 | European Pat. Off. . |
| 0133505 | 7/1984 | European Pat. Off. . |
| 1173074 | 7/1964 | Fed. Rep. of Germany . |
| 2366219 | 4/1978 | France . |
| 214483 | 4/1924 | United Kingdom ............ 423/82 |

Primary Examiner—Michael Lewis
Assistant Examiner—Steven Bos
Attorney, Agent, or Firm—Sprung Horn Kramer & Woods

[57] ABSTRACT

A process for the preparation of titanium dioxide by the sulphate process in which titanium raw materials are decomposed with sulphuric acid, the resulting titanyl sulphate is hydrolyzed, the waste acid is separated from the hydrolyzate and evaporated to a concentration of 60 to 70%, sulphuric acid is separated from the solid metal sulphates, and the sulphuric acid which has been concentrated by evaporation is used again for the decomposition of the titanium raw material, the improvement wherein the 60 to 70% sulphuric acid is concentrated to 70 to 80% $H_2SO_4$ in a further evaporation stage and the concentration of a part of this sulphuric acid is raised to a concentration of 98 to 99% $H_2SO_4$ by the absorption of $SO_3$ and then used together with the remainder of the above-mentioned 70 to 80% sulphuric acid for the decomposition of titanium raw materials.

5 Claims, No Drawings

PROCESS FOR THE PREPARATION OF TITANIUM DIOXIDE

This is a continuation of application Ser. No. 196,000, filed May 19, 1988, now abandoned.

This invention relates to a process for the preparation of titanium dioxide by the sulphate process in which titanium raw materials are decomposed with sulphuric acid, the titanyl sulphate produced is hydrolyzed, the waste acid is separated from the hydrolyzate and concentrated by evaporation to such an extent that a 60 to 70% sulphuric acid is separated from the solid metal sulphates present, and the sulphuric acid which has been concentrated by evaporation is reused for the decomposition of titanium raw material.

DE-B 1 173 074 (=U.S. Pat. No. 3,210,156) discloses a process for working up waste acid by evaporative concentration in evaporators using submerged combustion burners. In this process, the solid metal sulphates present are separated from the 60 to 70% sulphuric acid and this sulphuric acid is concentrated by evaporation to an $H_2SO_4$ content of from 93.5 to 95% by heating to 300° to 330° C. in cast iron vessels with dephlegmators. This highly concentrated sulphuric acid is used for the decomposition of the titanium raw material after separation of the metal sulphates. The disadvantages of this process lie in the very high initial investment costs, the high energy consumption and the high cost of maintenance.

EP-B 133 505 discloses a process for the evaporative concentration of waste acids in several stages under vacuum, in which a suspension of metal sulphates in 62 to 70% sulphuric acid is formed. This acid is used for the decomposition of titanium raw material either as such or after further evaporation to a concentration of 75 to 85% of $H_2SO_4$. One disadvantage of this process is that it requires oleum to be mixed with the recovered acid to raise it to the concentration required for the decomposition reaction. It is necessary to evaporate the recovered sulphuric acid to a concentration in the region of 80 to 96% $H_2SO_4$, especially if the recovered sulphuric acid constitutes a high proportion of the total quantity of sulphuric acid used for decomposition of the titanium raw material, as is the case in particular when titanium slag is used as raw material. In order to obtain a mixed acid with an $H_2SO_4$ content of 88 to 93% as required for the decomposition reaction, the recovered acid need only be evaporated to a concentration at the lower end of the aforesaid range of 80 to 96% if oleum is available but to a concentration in the upper range when only 95 to 98% sulphuric acid is available, but the cost of concentrating the recovered sulphuric acid increases disproportionately at the higher concentrations and thus renders the preparation of titanium dioxide less economical.

It is therefore an object of the present invention to provide a process which avoids the disadvantages of the process described above.

According to the invention, this object is achieved by evaporating the 60 to 70% sulphuric acid obtained from the waste acid until a sulphuric acid concentration of from 70 to 80% is obtained and then using a portion of this sulphuric acid for the absorption of $SO_3$ and then using the resulting approximately 98% sulphuric acid together with the remainder of the recovered 70 to 80% sulphuric acid for the decomposition of the titanium raw material.

The present invention therefore relates to a process for the preparation of titanium dioxide by the sulphate process in which titanium raw materials are decomposed with sulphuric acid, the resulting titanyl sulphate is hydrolyzed, the waste acid is separated from the hydrolyzate and evaporated to such an extent that a 60 to 70% sulphuric acid is separated from the solid metal sulphates present, and the sulphuric acid which has been concentrated by evaporation is used again for the decomposition of the titanium raw material, the 60 to 70% sulphuric acid being concentrated to 70 to 80% $H_2SO_4$ in a further evaporation stage II and part of this sulphuric acid being raised to a concentration of 98 to 99% $H_2SO_4$ by the absorption of $SO_3$ and then used together with the remainder of the above-mentioned 70 to 80% sulphuric acid for the decomposition of titanium raw materials. The $SO_3$ is advantageously produced by the catalytic oxidation of $SO_2$ which is obtained from the thermal decomposition of the metal sulphates separated from the waste acid.

In detail, the process according to the invention consists of the following process steps:

The 60 to 70% sulphuric acid obtained in known manner, e.g. by evaporative concentration of the waste acid and separation of the metal sulphates according to EP-B 133 505, is evaporated to a concentration in the region of 70 to 80% $H_2SO_4$ content. The waste heat from $TiO_2$ calcining may advantageously be used for this evaporation, e.g. as described in EP-B 97 259. In one particularly preferred embodiment of the process according to the invention, the 70 to 80% sulphuric acid is divided into two portions in such a manner that when the 98 to 99% sulphuric acid is mixed with the remainder of the 70 to 80% sulphuric acid, a sulphuric acid concentration in the region of 88 to 93% is obtained. It is particularly preferred to carry out evaporation stage II under vacuum in forced circulation evaporators using graphite heat exchangers, but it may also be carried out under vacuum in forced circulation evaporators or horizontal evaporators using heat exchangers equipped with tantalum pipes.

Since the process according to the invention only requires the $H_2SO_4$ content of the recovered acid to be concentrated to about 70 to 80%, the concentrative evaporation under vacuum may be carried out under advantageous conditions which enable relatively small heat transfer surfaces and advantageous constructional materials to be employed and results in only very low sulphuric acid losses.

It is particularly advantageous that a sulphuric acid concentration in the required range may also be obtained by utilization of waste heat as EP-B 97 259.

According to this invention, the 70 to 80% sulphuric acid obtained by concentrative evaporation is divided into two parts, one of which is used for the absorption of $SO_3$. The $SO_2$ from which the $SO_3$ was prepared by catalytic oxidation is preferably produced by thermal decomposition of the metal sulphates separated from the waste acid. The absorption of $SO_3$ is carried out in known manner in 98 to 99% sulphuric acid at temperatures of from 80° to 150° C. and according to the invention, part of the recovered 70 to 80% sulphuric acid is added instead of water. The 98 to 99% sulphuric acid obtained which contains dissolved metal sulphates may advantageously be used directly for the decomposition of titanium raw material without prior cooling. A particularly preferred variation of the process according to the invention therefore consists in that the 98 to 99% sulphuric acid is directly used for the decomposition of titanium raw material, preferably at a temperature of 40° to 130° C., without separation of the metal sulphates. In this case, the sensible heat of the acid starts the decomposition reaction without water or steam having to be introduced into the mixture of raw materials. It is also in accordance with the present invention, however, to cool the 98 to 99% sulphuric acid containing metal sulphates to temperatures of from 40° to 70° C. and optionally also to separate the metal sulphates. In another variation of the process according to the invention, therefore, the 98 to 99% sulphuric acid is cooled to 40° to 70° C. and the crystallized metal sulphates and/or hydrogen sulphates are separated off before the sulphuric acid is used for the decomposition of titanium raw material.

The exact concentration of the 70 to 80% sulphuric acid recovered by evaporative concentration and the proportion of this acid used for $SO_3$ absorption depend on what proportion of the sulphuric acid recovered by evaporative concentration is present in the total quantity of sulphuric acid used for the decomposition of raw material and what concentration of sulphur is required at the beginning of the decomposition reaction for the given titanium raw material. The man of the art can determine these proportions by calculation.

The invention is described below by way of the examples which do not, however, limit the invention.

COMPARISON EXAMPLE

For the preparation of titanium dioxide from titanium slag, 60% of the sulphuric acid required for the decomposition of the slag should be used as sulphuric acid recovered by evaporative concentration from the dilute acid and 40% of the sulphuric acid should be used as 98% sulphuric acid produced by the reaction of $SO_3$ with water. The sulphuric acid concentration should be 90% at the beginning of the decomposition reaction (concentrations are given as percent by weight in salt-free acid, i.e.

$$\frac{H_2SO_4}{H_2SO_4 + H_2O} \times 100,$$

without taking into account any dissolved or suspended metal sulphates).

These conditions require 367.3 kg of 98% sulphuric acid and 632.7 kg of recovered sulphuric acid at a concentration of 85.3% $H_2SO_4$ per ton of the 90% sulphuric acid used for decomposition of the raw material. The preparation of this 85.3% sulphuric acid from recovered 65% sulphuric acid cannot be carried out by the utilization of waste heat according to EP-C 97 259. Concentration of the acid is therefore carried out in a horizontal evaporator at temperatures of up to 165° C. and a pressure of 80 mbar. 198 kg of water must be evaporated from 830.7 kg of 65% sulphuric acid for the production of 1 ton of the 90% acid used for decomposition. This requires the consumption of about 340 kg of steam at 15 bar.

EXAMPLE 1

The requirements concerning the composition of the sulphuric acid at the beginning of the decomposition reaction are the same as in Comparison Example. The figures given for the weights refer to the preparation of 1 ton of 90% sulphuric acid, corresponding to 900 kg of $H_2SO_4$. According to this invention, 830.7 kg of 65% sulphuric acid are only evaporated to a concentration of 76.5% $H_2SO_4$. The evaporation of 125 kg of water is carried out in a forced circulation evaporator with graphite heat exchanger at 60 mbar and 125° C. About 210 kg of 6 bar-steam are used. 376.7 kg of the sulphuric acid which has been concentrated to 76.5% by evaporation is used directly for decomposition of the raw material. The other 327 kg are fed into the $SO_3$ absorber of the sulphuric acid production plant. At this rate of input, 623 kg of 98.2% sulphuric acid are discharged at a temperature of 120° C. and used for the decomposition of titanium slag.

EXAMPLE 2

The ratio of sulphuric acid recovered by concentrative evaporation to the sulphuric acid prepared by the reaction of $SO_3$ with water is the same as in the Comparison example, but the concentration of sulphuric acid at the beginning of the decomposition reaction is 92% instead of 90%. The figures given for weights refer to 978.3 kg of 92% sulphuric acid, corresponding to 900 kg of $H_2SO_4$. According to the invention, 830.7 kg of 65% sulphuric acid are concentrated by evaporation to a concentration of 78.9% $H_2SO_4$ in a horizontal evaporator having a nest of tantalum pipes as heat exchanger. The evaporative concentration is carried out at temperatures of from 100° to 145° C. and at 100 mbar. 146.3 kg of water are required to be evaporated from the sulphuric acid. This requires about 240 kg of steam at 12 bar. 310 kg of 78.9% sulphuric acid are used directly for the decomposition of raw material; 374.3 kg are used for the absorption of $SO_3$. 668.3 kg of 98.1% sulphuric acid are accordingly discharged from the $SO_3$ absorption and used for the decomposition of the raw material.

(According to the state of the art, as described in the Comparison example, the sulphuric acid recovered by evaporative concentration would have to be further evaporated to a concentration of 88.4%. The consumption of steam would be about 10% higher than in the Comparison example and about 55% higher than in the present example 2).

Concentrations are given as percent by weight in this application.

What is claimed is:

1. In a process for the preparation of titanium dioxide by the sulphate process comprising decomposing titanium raw materials with sulphuric acid, hydrolyzing the titanyl sulphate produced from the decomposition, separating the waste sulphuric acid from the hydrolyzate of the titanyl sulphate hydrolysis and evaporating the waste sulphuric acid to a concentration of 60 to 70%, separating sulphuric acid from the solid metal sulphates present, concentrating the sulphuric acid which has been concentrated by evaporization for reuse in the decomposition of titanium raw material, the improvement comprising concentrating the 60 to 70% sulphuric acid from which solid metal sulphates have been separated in a further evaporative stage to a concentration of 70 to 80% $H_2SO_4$ and raising the concentration of a part of this sulphuric acid to a concentration of 98 to 99% by the absorption of $SO_3$ and combining the so-obtained 98 to 99% $H_2SO_4$ with the remainder of the sulphuric acid concentrated by evaporation to 70 to 80%, the part of the 70 to 80% $H_2SO_4$ concentrated to 98 to 99% and the remainder of the 70 to 80% $H_2SO_4$ being in such proportion to one another that when combined a $H_2SO_4$ concentration of from 88 to 93% is obtained for reuse in the decomposition of titanium raw material.

2. A process according to claim 1, comprising carrying out the further evaporation stage under vacuum in forced circulation evaporators with graphite heat exchangers.

3. A process according to claim 1, comprising carrying out the further evaporation stage under vacuum in forced circulation evaporators or horizontal evaporators with heat exchangers equipped with tantalum pipes.

4. A process according to claim 1, wherein the 98 to 99% sulphuric acid is directly used for the decomposition of titanium raw material at a temperature of from 40° to 130° C. without separation of the metal sulphates.

5. A process according to claim 1, further comprising cooling the 98 to 99% sulphuric acid to 40° to 70° C. and separating off the crystallized metal sulphates and/or hydrogen sulphates before the sulphuric acid is used for the decomposition of titanium raw material.

* * * * *